Sept. 13, 1955 G. J. PARKER 2,717,689
GRIPPER CONVEYOR FOR WRAPPING MACHINES
Filed April 29, 1952 3 Sheets-Sheet 2

INVENTOR
George James Parker
By Watson, Cole, Grindle and Watson
ATTORNEYS

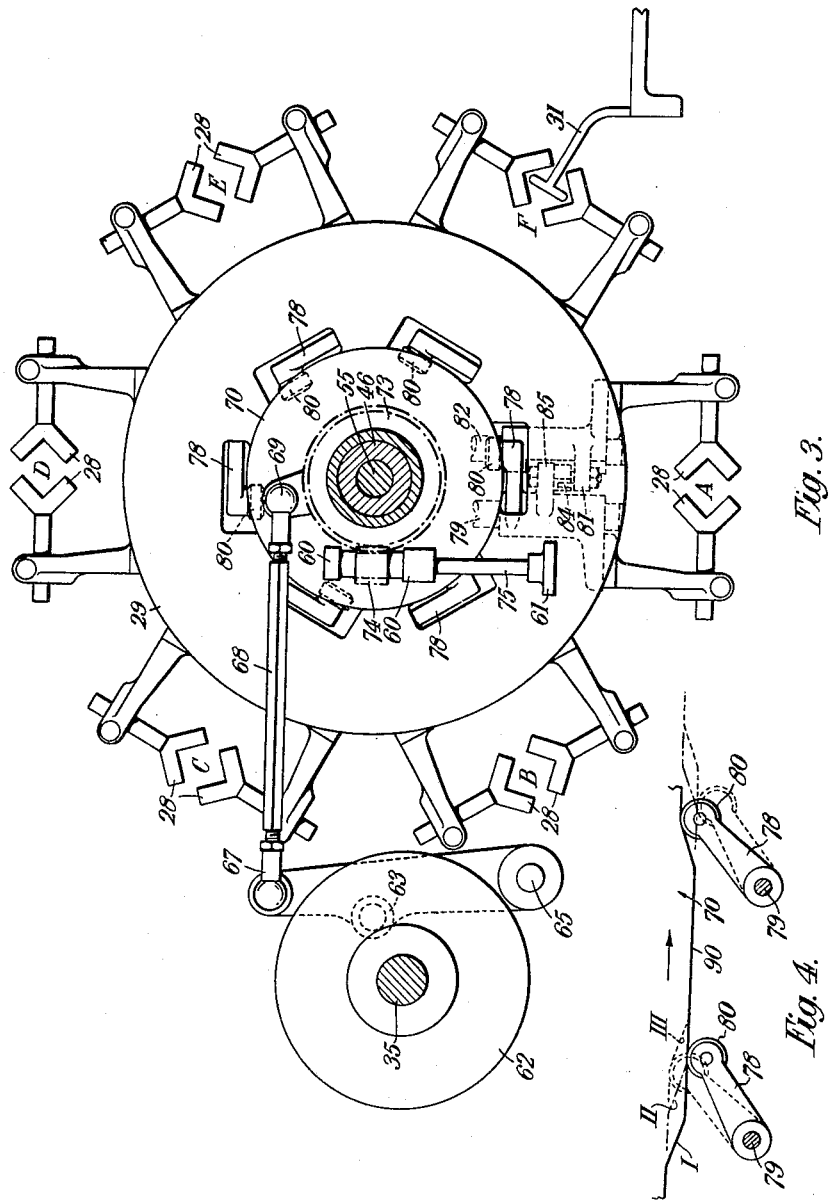

United States Patent Office 2,717,689
Patented Sept. 13, 1955

2,717,689

GRIPPER CONVEYOR FOR WRAPPING MACHINES

George James Parker, Scholes, near Leeds, England, assignor to The Forgrove Machinery Company Limited, Leeds, England, a company of Great Britain Application April 29, 1952, Serial No. 284,901

Claims priority, application Great Britain May 1, 1951

6 Claims. (Cl. 198—210)

This invention relates to wrapping machines of the type comprising an intermittently rotating carrier head, a plurality of pairs of gripper arms mounted on the carrier head, each arm carrying a gripper and the grippers on each pair of arms being adapted to grip between them an article to be wrapped, a cam mounted to rotate on the same axis as the carrier head, all of said pairs of gripper arms coacting with the cam, and mechanism for oscillating the cam so as to impart periodic opening and closing movement to the grippers.

Such machines may be organised for either bunch or twist wrapping and are in common use for wrapping sweets, the articles being loaded in succession, each with a wrapper partly wrapped about it, into the pair of grippers dwelling at a loading station and being thereafter carried by rotation of the carrier head to one or more wrapping stations and finally to a discharge station at which the wrapped articles are discharged from the grippers. The cam operates in properly timed relationship with the movement of mechanism for loading the articles into the grippers and of mechanism for ejecting the wrapped articles to open and close the pairs of grippers dwelling at the loading station, and preferably also the grippers dwelling at the discharge station, the grippers however remaining closed throughout their travel from the loading to the discharge station.

When a change is made in the size of the articles to be wrapped it is necessary to adjust the distance between each pair of grippers. Provision for such adjustment may be made by mounting each gripper on its supporting arm so that it is adjustable towards and away from the companion gripper and holding it in adjusted position by a clamping screw. It is however troublesome and inconvenient to have to perform an individual adjustment to each gripper, and there is no assurance that the operator will impart the same adjustment to all the grippers. The object of the invention is to overcome these disadvantages.

The invention provides a wrapping machine of the above type, wherein the gripper opening cam is mounted for longitudinal adjustment on a sleeve which is mounted to rotate in relation to the carrier head, and comprising manually operable means for effecting longitudinal adjustment of the cam in relation to the sleeve for the purpose of varying the distance between the cam and all of the pairs of grippers. This single adjustment of the cam can be effected easily and rapidly and will ensure that an equal adjustment is imparted to all of the pairs of grippers.

In one arrangement according to the invention, the cam is in screw-threaded engagement with the sleeve and the sleeve is geared to an adjusting spindle rotatably mounted on the cam. By turning the spindle therefore, the sleeve will be turned thereby imparting, through the screw thread, the required longitudinal adjustment to the cam.

One embodiment of confectionery wrapping machine according to the invention, organised for bunch wrapping, will now be described in detail by way of example, with reference to the accompanying drawings, in which:

Fig. 3 is a section on the line III—III in Fig. 1 and

Fig. 4 is a diagram showing successive positions adopted by the gripper opening cam.

Like reference characters designate like parts throughout the figures.

Figure 1:
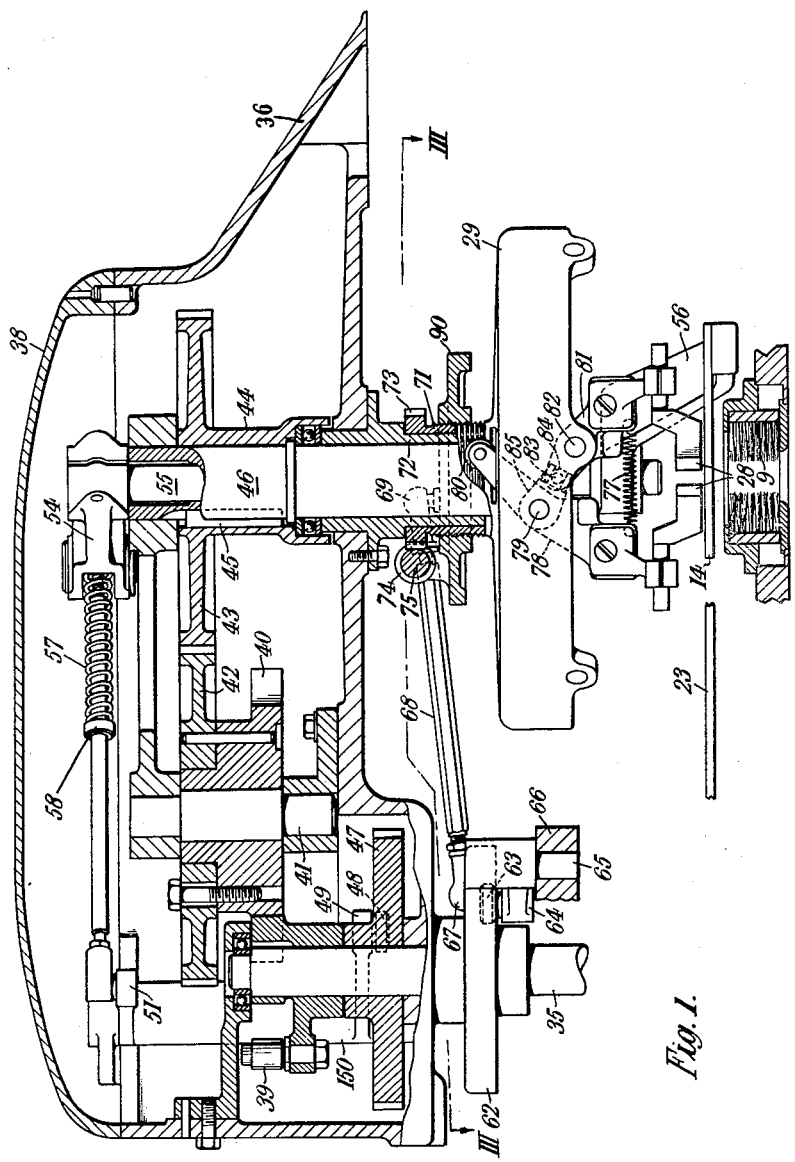
Fig. 1 is a vertical section through the top gear box of the machine.

The machine shown in the drawings is of the construction described in U. S. application, Serial No. 283,334 and now Patent No. 2,643,500 and comprises a suspended carrier head 29 which carries six pairs of cam-operated grippers 28. The carrier head 29 is intermittently rotated, as later described, to bring the grippers in succession from a loading station A (Fig. 3) to an idle station B, then to a heating station C, then to a pair of successive cooling stations D and E and finally to a discharge station F.

Figure 2:
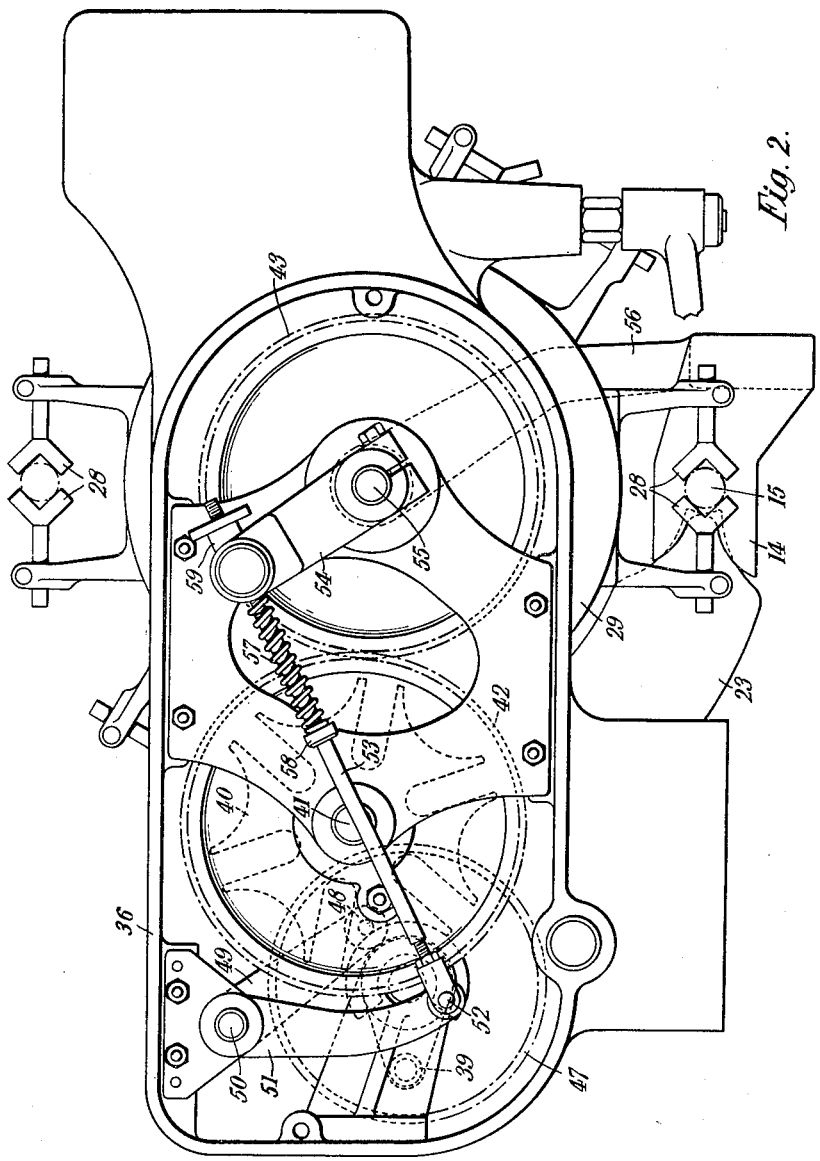
Fig. 2 is a plan view of the top gear box, with the cover removed.

At the loading station A, a tablet with a wrapper is lifted by a lifting plunger and a cooperating top plunger through a brush 9 (Fig. 1) into the gripper jaws 28 dwelling at the loading station. The brush 9 drapes the wrapper partly around the tablet, which is indicated at 15 in Fig. 2. The lifting plunger and top plunger are not shown, but they operate as more fully described in U. S. application, Serial No. 283,332. After the grippers 28 have closed on the tablet, a first folder 14 is moved across the base of the tablet, to the position shown in Fig. 2, to fold part of the depending wrapper against it. As the tablet travels to the idle station B a fixed folder plate 23 folds the remaining dependent portion of the wrapper against its base.

As described in U. S. application, Serial No. 284,996, at the heating station C a heater is pressed against the base of the tablet to produce a heat seal between the pleats of wrapper folded against the base, and a top padder presses against the top of the tablet. At the next station D to which the tablet is moved by the carrier head, a cooling pad is pressed against the base of the tablet and a top padder against its top. At the next station E a cooling pad is pressed against the base of the tablet. Finally, at the discharge station F the grippers are opened by their cam and an ejector 31 (Fig. 3) ejects the wrapped and heat sealed tablet down a chute.

A vertical driving shaft 35 extends upwardly into a top gear box 36, fitted with a removable cover 38. The vertical shaft 35 carries a crank pin 39 which periodically engages a Geneva wheel 40, rotatably mounted on a shaft 41 and bolted to a gear wheel 42 also mounted to turn on the shaft 41.

The gear wheel 42 meshes with a gear wheel 43, the hub 44 of which is keyed, by a key 45, to a tubular shaft 46, to the lower end of which is fixed the carrier head 29. Intermittent rotation is therefore imparted to the carrier head 29 to bring the six pairs of grippers 28 carried thereby successively to the loading station.

The vertical shaft 35 carries a cam 47, coacting with a follower 48 on an arm 49 integral with the lower end of a sleeve 150 mounted to turn on a pin 50. Integral with the upper end of the sleeve 150 is an arm 51, pivotally connected, at its end 52, to a rod 53. The rod 53 passes through a hole in an arm 54 fixed to the upper end of a shaft 55 nested within and projecting downwardly from the tubular shaft 46. At its lower end, the shaft 55 carries an arm 56 to which is fixed the first folder 14. A spring 57 is mounted in compression between a collar 58 on the rod 53 and the end of the arm 54. The first folder 14 is therefore driven on its forward stroke, to the position shown in Figs. 1 and 2, through the spring 57, which can yield in the event of obstruction to movement of the folder. An abutment 59 on the rod 53 coacts with the arm 54 to impart a positive return stroke to the folder 14.

Also mounted on the vertical shaft 35, immediately below the top gear box 36, is a cam 62, coacting with a follower 63 on an arm 64, mounted on a pin 65 pivoted to a member 66 of the machine framework. The end of the arm 64 is connected by a ball joint 67 to a rod 68. A ball joint 69 connects the other end of the rod 68 to a gripper-actuating cam 70 which is in screw-thread engagement with a sleeve 71 mounted to rotate on a sleeve 72 which forms a bearing for the lower end of the tubular shaft 46. The sleeve 71 is integral with a worm wheel 73, meshing with a worm 74 on a spindle 75 supported in brackets 60 on the cam 70. By turning a hand knob 61 on the end of the spindle 75, the sleeve 71 will be caused to turn in relation to the sleeve 72. The cam 70 is prevented by the rod 68 from turning with the sleeve 71 and the screw-threaded connection between the sleeve 71 and the cam 70 will accordingly cause vertical adjustment of the cam 70 in relation to the sleeve 71. The worm wheel 73 has straight teeth so as to permit of such adjustment of the cam 70.

The left hand gripper, as seen in the drawings, of each pair of grippers 28 is supported on an arm 78 pivoted on a pin 79 fitted to the carrier head and carrying a follower 80 coacting with the gripper opening cam 70. The right hand gripper of each pair is supported on an arm 81 pivoted on a pin 82 fitted to the carrier head and carrying a pin 83 engaging a slot 84 in an arm 85 fixed to the arm 78. A spring 77 urges each pair of grippers to the closed position and maintains its follower 80 in engagement with the cam 70. The grippers are closed when the follower 80 engages the low portion of the cam 70. When, however, the cam 70 is rocked to bring a high portion 90 thereof into engagement with the follower 80, the latter is depressed, causing the gripper jaws to open. The spacing between the gripper jaws in the open and closed position is therefore determined by the position of longitudinal adjustment of the cam 70 in relation to the sleeve 71.

Fig. 4 shows, diagrammatically, the position assumed by the cam in relation to the followers 80 of the grippers at the loading station A and at the discharge station F. When the carrier head comes to rest, the cam 70 occupies the position I in Fig. 4. The result is that the grippers which have just reached the loading station are open by reason of their followers coacting with the high portion 90 of the cam. The cam 70 at once moves, in an anti-clockwise direction as seen from above, to position II. This depresses the follower 80 of the grippers at the discharge station F, but without imparting any movement to the grippers at the loading station A. When a tablet has been lifted into the grippers at the loading station A, the cam 70 makes a further movement to position III, allowing the grippers to close on the tablet. During the next movement of the carrier head the cam 70 returns to position I with the result that the grippers travelling from the discharge station F to the loading station A are retained open, but the grippers leaving the loading station A remain closed as they are now in advance of the high portion 90 of the cam. These grippers remain closed until they reach the discharge station and are opened, while dwelling there, by movement of the cam to position II.

What I claim as my invention and desire to secure by Letters Patent is:

1. In a wrapping machine, the combination of a carrier head, a plurality of pairs of gripper arms pivotally mounted on said carrier head, a gripper on each gripper arm, spring means urging the grippers on each pair of arms to position to grip an article to be wrapped, means for imparting intermittent rotation to the carrier head to traverse the pairs of grippers in succession from a loading station to a discharge station, a sleeve coaxial with the carrier head and mounted for rotational adjustment in relation to the carrier head, a cam in screw threaded engagement with said sleeve, a gripper arm of each pair coacting with said cam, means for imparting oscillating movement to the cam, in timed relationship with the movement of the carrier head, to open and close the grippers, an adjusting spindle rotatably mounted on said cam, and gearing, connecting said spindle to said sleeve, for imparting rotation to said sleeve and thereby effecting through the screw thread longitudinal adjustment of said cam in relation to said sleeve.

2. In a wrapping machine, the combination of a carrier head, a plurality of pairs of gripper arms pivotally mounted on said carrier head, a gripper on each gripper arm, spring means urging the grippers on each pair of arms to position to grip an article to be wrapped, means for imparting intermittent rotation to the carrier head to traverse the pairs of grippers in succession from a loading station to a discharge station, a cam disposed coaxially with the carrier head, a member coaxial with the cam and supporting said cam, said cam being longitudinally adjustable on said supporting member and a gripper arm of each pair coacting with said cam, means for imparting oscillating movement to the cam while the carrier head is dwelling to open the grippers at the discharge station and thereafter to cause the grippers at the loading station to close, and for returning the cam to its initial position on further movement of the carrier head, said cam maintaining the grippers closed during their travel from the loading station to the discharge station, and manually operable means for adjusting the cam longitudinally in relation to said supporting member and thereby simultaneously imparting adjustment to all of said pairs of grippers.

3. In a wrapping machine, the combination of a carrier head, a shaft supporting said carrier head, a plurality of pairs of gripper arms pivotally mounted on said carrier head, a gripper on each gripper arm, spring means urging the grippers on each pair of arms to position to grip an article to be wrapped, means for imparting intermittent rotation to the carrier head to traverse the pairs of grippers in succession from a loading station to a discharge station, a gripper opening cam mounted for rotation in relation to said shaft, a gripper arm of each pair coacting with said gripper opening cam, a driving cam, means for continuously rotating said driving cam, a link for imparting oscillating movement to said gripper opening cam, from said driving cam, to open and close the grippers, and manually operable means for effecting axial adjustment of said gripper opening cam in relation to said shaft, and thereby simultaneously imparting adjustment to all of said pairs of grippers.

4. In a wrapping machine, the combination of a carrier head, a shaft supporting said carrier head, a plurality of pairs of gripper arms pivotally mounted on said carrier head, a gripper on each gripper arm, spring means urging the grippers on each pair of arms to position to grip an article to be wrapped, means for imparting intermittent rotation to the carrier head to traverse the pairs of grippers in succession from a loading station to a discharge station, a gripper opening cam mounted for rotation in relation to said shaft, a gripper arm of each pair coacting with said gripper opening cam, a driving cam, means for continuously rotating said driving cam, a follower coacting with said driving cam, a pivoted arm carrying said follower, a rod, ball joints connecting opposite ends of said rod to said arm and to said gripper opening cam respectively, said rod imparting oscillating movement to said gripper opening cam, from said driving cam, to open and close the grippers, and manually operable means for effecting axial adjustment of said gripper opening cam in relation to said shaft and thereby simultaneously imparting adjustment to all of said pairs of grippers.

5. In a wrapping machine, the combination of a carrier head, a shaft supporting said carrier head, a plurality of pairs of gripper arms pivotally mounted on said carrier head, a gripper on each gripper arm, spring means urging the grippers on each pair of arms to position to grip an article to be wrapped, means for imparting intermittent rotation to the carrier head to traverse the pairs of grippers in succession from a loading station to a discharge station, a sleeve mounted for rotation on said saft, a gripper opening cam in screw threaded engagement with said sleeve, a gripper arm of each pair coacting with said gripper opening cam, a driving cam, means for continuously rotating said driving cam, a cam follower coacting with said driving cam, a pivoted arm carrying said follower, a rod, ball joints connecting opposite ends of said rod to said arm and to said gripper opening cam respectively, said rod imparting oscillating movement to said gripper opening cam, from said driving cam, to open and close the grippers, an adjusting spindle rotatably mounted on said gripper opening cam, and gearing connecting said spindle to said sleeve, for imparting rotation to said sleeve from said spindle and thereby effecting through the screw thread axial adjustment of the gripper operating cam on the sleeve.

6. In a wrapping machine, the combination of a carrier head, a vertical shaft supporting said carrier head, a gear box disposed above said carrier head, a plurality of pairs of gripper arms pivotally mounted on said carrier head, a gripper on each gripper arm, spring means urging the grippers on each pair of arms to position to grip an article to be wrapped, Geneva mechanism in the gear box for imparting intermittent rotary movement to said shaft to traverse the pairs of grippers in succession from a loading station to a discharge station, a gripper opening cam mounted for rotation in relation to said shaft between said carrier head and said gear box, a gripper arm of each pair coacting with said gripper opening cam, a continuously rotating driving shaft extending into said gear box for actuating said Geneva mechanism, a driving cam on said driving shaft, a link for imparting oscillating movement to said gripper opening cam, from said driving cam, to open and close the grippers, and manually operable means for effecting axial adjustment of said gripper opening cam in relation to said shaft, and thereby simultaneously imparting adjustment to all of said pairs of grippers.

References Cited in the file of this patent

UNITED STATES PATENTS

| 2,137,656 | Rose | Nov. 22, 1938 |
| 2,371,748 | Fedorchak | Mar. 20, 1945 |
| 2,630,260 | Tracy et al. | Mar. 3, 1953 |

FOREIGN PATENTS

| 116,950 | Australia | May 20, 1943 |